(12) United States Patent
Dong et al.

(10) Patent No.: US 10,477,560 B1
(45) Date of Patent: Nov. 12, 2019

(54) SYSTEMS AND METHODS FOR PERFORMING CARRIER AGGREGATION ACROSS REGIONS WITH DIVERSE LICENSED CARRIERS

(71) Applicant: Verizon Patent and Licensing Inc., Arlington, VA (US)

(72) Inventors: Yuexin Dong, Bridgewater, NJ (US); Jignesh S. Panchal, Hillsborough, NJ (US); Zheng Zhao, Plainsboro, NJ (US); Krishnamurthy Sreenath, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/143,152

(22) Filed: Sep. 26, 2018

(51) Int. Cl.
*H04W 72/06* (2009.01)
*H04W 72/04* (2009.01)
*H04W 76/10* (2018.01)
*H04W 88/08* (2009.01)
*H04W 88/02* (2009.01)

(52) U.S. Cl.
CPC ....... *H04W 72/06* (2013.01); *H04W 72/0453* (2013.01); *H04W 76/10* (2018.02); *H04W 88/02* (2013.01); *H04W 88/08* (2013.01)

(58) Field of Classification Search
CPC ....... H04L 5/001; H04L 5/006; H04L 5/0092; H04W 72/04; H04W 72/06; H04W 72/0453; H04W 76/10; H04W 88/02; H04W 88/08
See application file for complete search history.

(56) References Cited

U.S. PATENT DOCUMENTS

| | | | |
|---|---|---|---|
| 2006/0154684 A1* | 7/2006 | Meiyappan | H04L 5/0037 455/522 |
| 2018/0020358 A1* | 1/2018 | Breuer | H04W 16/14 |
| 2018/0220365 A1* | 8/2018 | Fang | H04W 72/04 |

* cited by examiner

*Primary Examiner* — Quoc Thai N Vu

(57) ABSTRACT

A system described herein may provide a technique for performing carrier aggregation in a wireless telecommunications network in a manner that accounts for (a) diverse licenses for different carriers across different regions, (b) network considerations in minimizing the number of times carrier aggregation is performed, and (c) user equipment ("UE") considerations in maximizing battery life by utilizing only the carriers that are necessary to utilize. A smallest carrier (or group of carriers) may be identified as a default carriers, and other carriers or groups of carriers may be ranked in descending order, according to size. The ranked list may be iteratively used when performing carrier aggregation, in which the largest available carrier (or group of carriers) from the list may be used for carrier aggregation.

20 Claims, 7 Drawing Sheets

400 ⟶

| Region | C1 | C2 | C3 | C4 | C5 | C6 | C7 | C8 |
|---|---|---|---|---|---|---|---|---|
| A |  | X | X | X |  |  |  | X |
| B |  | X |  | X | X |  | X |  |
| C | X |  | X | X | X |  |  |  |

FIG. 4

|  | C1 | C2 | C3 | C4 | C5 | C6 | C7 | C8 | C9 | C10 | C11 | C12 | C13 | C14 | C15 | C16 | C17 |
|---|---|---|---|---|---|---|---|---|---|---|---|---|---|---|---|---|---|
| Region D |  | X | X | X | X |  | X |  |  | X | X |  | X | X | X |  | X |

Groupings: 1 (C2–C5), 4 (C7), 0 (Default) (C8), 2 (C10–C11), 3 (C13–C14), 5 (C15), 6 (C17)

| Region | C1 | C2 | C3 | C4 | C5 | C6 | C7 | C8 | C9 | C10 | C11 | C12 | C13 | C14 | C15 | C16 | C17 |
|---|---|---|---|---|---|---|---|---|---|---|---|---|---|---|---|---|---|
| D |  | 1 | 1 | 1 | 1 | 4 |  | 0 |  | 2 | 2 |  | 3 | 3 | 5 |  | 6 |
| E | 0 |  | 3 | 3 |  | 1 | 1 | 1 | 1 | 2 | 2 | 2 | 2 |  |  | 4 |  |

FIG. 6B

SYSTEMS AND METHODS FOR PERFORMING CARRIER AGGREGATION ACROSS REGIONS WITH DIVERSE LICENSED CARRIERS

BACKGROUND

Wireless telecommunications providers may be authorized, or licensed (e.g., by a governmental or other type of authoritative entity) to utilize certain portions (or "carriers") of the radio frequency ("RF") spectrum. Using licensed carriers, a particular wireless telecommunications provider may offer wireless connectivity to user equipment ("UE"), such as mobile telephones or other wireless communication devices. In some situations, the carriers that are licensed to a given wireless telecommunications provider may differ on a region-to-region basis. For example, providers may be licensed to use different carriers in different counties, states, provinces, or other types of jurisdictions or delineations of geographic regions.

BRIEF DESCRIPTION OF THE DRAWINGS

FIG. 4 illustrates an example data structure that may be used to indicate which carriers are available (e.g., licensed) for a given wireless telecommunications provider;

FIGS. 6A and 6B illustrate example data structures that may be used to indicate carrier groups and their respective rankings;

DETAILED DESCRIPTION OF THE PREFERRED EMBODIMENTS

The following detailed description refers to the accompanying drawings. The same reference numbers in different drawings may identify the same or similar elements.

Wireless telecommunications networks may employ a technique known as "carrier aggregation," in which multiple carriers are used to communicate wirelessly with UEs. Carrier aggregation may allow for more throughput, a more robust connection, and/or may provide other benefits. However, the more carriers that are utilized for carrier aggregation, the higher the load on the network (e.g., more network resources need to be consumed in order to utilize more carriers), as well as increased power consumption by UEs (e.g., more power may need to be consumed by UEs in order to utilize more carriers). Further complicating matters, the availability of different carriers may vary across regions or jurisdictions (e.g., different counties, states, provinces, etc., may have different sets of carriers available for different wireless telecommunications providers). As such, some embodiments described herein provide techniques for providing carrier aggregation in a manner that balances the considerations of connection quality (e.g., throughput, latency, RF signal strength, etc.) and UE battery life, while also taking into account the different carriers that are available across different regions.

As shown in FIG. 1, for example, a base station may utilize a variety of different carriers. As mentioned above, a "carrier" refers to a range of frequencies at which the base station may utilize in order to communicate wirelessly with one or more UEs. For the purposes of this example, assume that each carrier is 50 Megahertz ("MHz") wide. As shown, the carriers may be arranged into groups ("Carrier groups") 101-106. While the word "group" is used herein, a Carrier group may, in some situations, include only a single carrier. For example, carrier group 1 may include a single carrier (i.e., Carrier group 1 is 50 MHz wide, in this example), while Carrier group 2 may include four carriers (i.e., Carrier group 2 is 200 MHz wide, in this example). As discussed herein, the carrier groups may be determined in any suitable manner, and may be determined on a per-region basis (e.g., where different regions have different carriers available to a given wireless telecommunications provider). As also described herein, one carrier group may be designated as a "default" or "initial" carrier group, which may be utilized upon initial connection, or attachment, of a given UE to the base station.

Figure 1A:
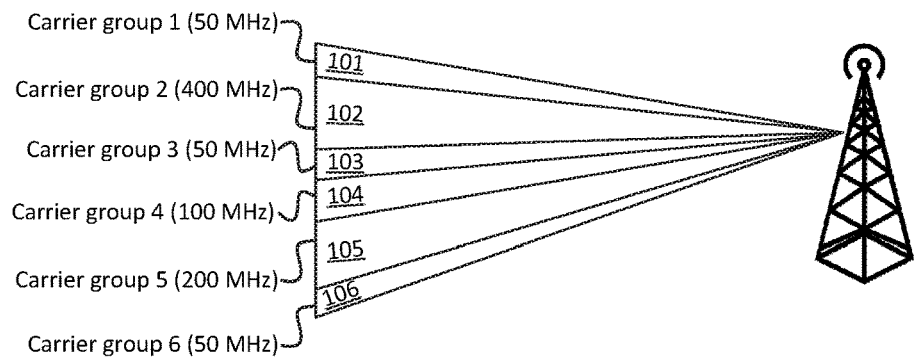
FIGS. 1A-1E illustrate an example overview of one or more embodiments described herein.
Figure 1B:
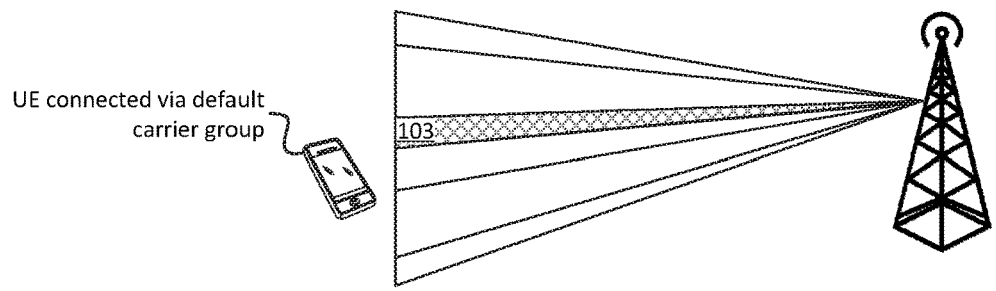

For example, as shown in FIG. 1B, a UE may connect to the base station, for which the base station may utilize the default Carrier group 103. In some embodiments, the default carrier group may be a relatively narrow carrier group (e.g., may contain the fewest carriers of all of the carrier groups). As mentioned above, using fewer carriers may yield better battery life from the perspective of the UE than using more carriers. However, using fewer carriers may yield lower effective throughput or a less robust connection than using more carriers.

Figure 1C:
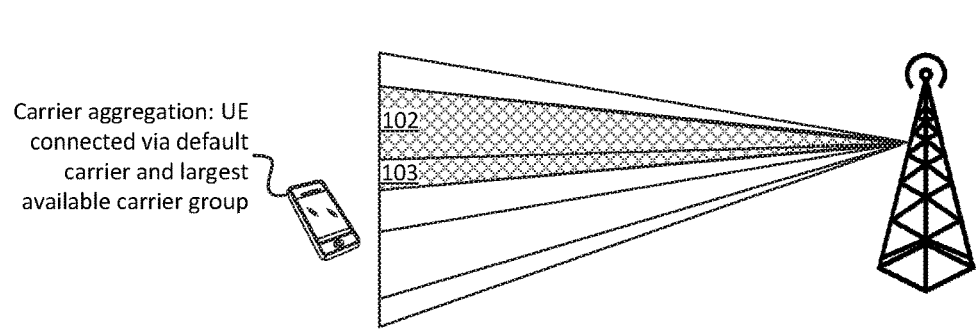

As shown in FIG. 1C, the need for carrier aggregation may be detected. For example, the base station and/or one or more other devices of the wireless telecommunications network may determine that carrier aggregation should be performed, the UE may request additional throughput, and/or carrier aggregation may be initiated through some other mechanism. In accordance with some embodiments, the largest available Carrier group (i.e., Carrier group 102, in this example, having a width of 400 MHz) may be selected and used for carrier aggregation. Once Carrier group 102 has been selected, carrier aggregation may be used, resulting in the carriers of Carrier groups 102 and 103 to be used for the connection between the UE and the base station.

In some embodiments, the widest available carrier group may be selected, in order to minimize the likelihood that carrier aggregation would be needed again. That is, utilizing a relatively wide carrier group may generally maximize the likelihood that the connection requirements (e.g., the requirements/criteria based on which carrier aggregation was initiated) are met, which would result in carrier aggregation not having to be performed again to add additional carriers.

Figure 1D:
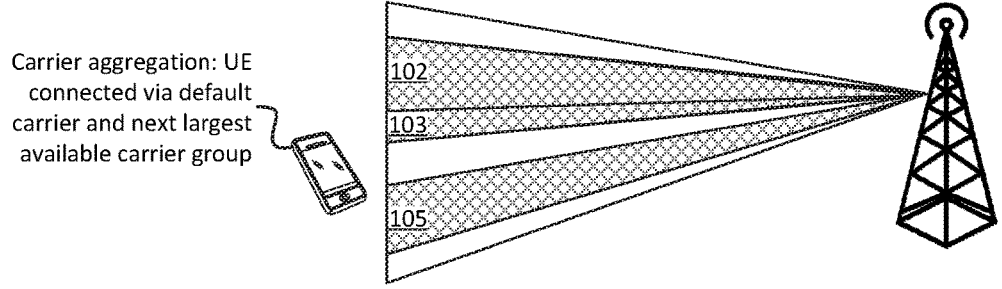

If, however, carrier aggregation is needed again (e.g., as shown in FIG. 1D), then the next widest carrier group (i.e., Carrier group 105, having a width of 200 MHz, in this example) may be selected. Choosing the next largest carrier group advances the objectives mentioned above (e.g., minimizing the likelihood that carrier aggregation would be needed again). While FIG. 1D illustrates a situation where carrier aggregation may need to be performed more than once, the quantity of times carrier aggregation would be performed to reach the result of FIG. 1D (e.g., all of the carriers of Carrier groups 102, 103, and 105 being used for carrier aggregation for the connection between the UE and the base station) may be lower (and the overall process may thus be faster) in accordance with the example embodiments discussed above with respect to FIGS. 1A-1D, as opposed to techniques in which carrier aggregation is performed in another way (e.g., adding one carrier at a time to the carrier aggregation).

Figure 1E:
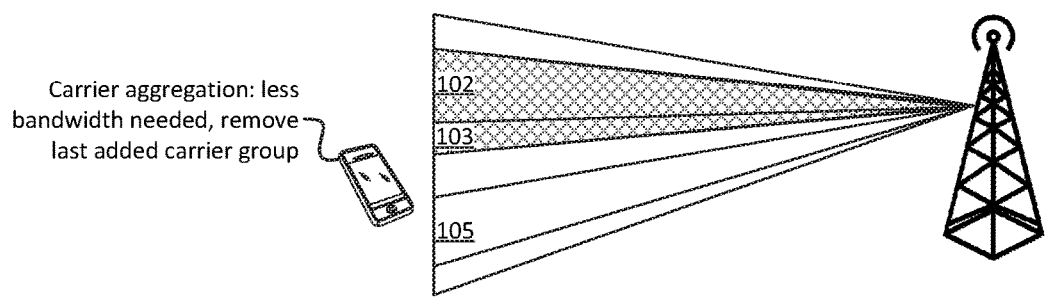

As further shown in FIG. 1E, if fewer carriers are needed than are currently being utilized (e.g., Carrier groups 102, 103, and 105), then the last added carrier group (Carrier group 105, in this example) may be removed from carrier aggregation. That is, the base station may no longer utilize the carriers of the last added carrier group. As mentioned above, and as further described below, the definitions of the carrier groups may vary from region to region, which may be necessitated by differing licenses for different carriers in the different regions. Some embodiments described herein may thus maintain different carrier group definitions for different regions, in order to seamlessly perform processes described herein.

Figure 2:
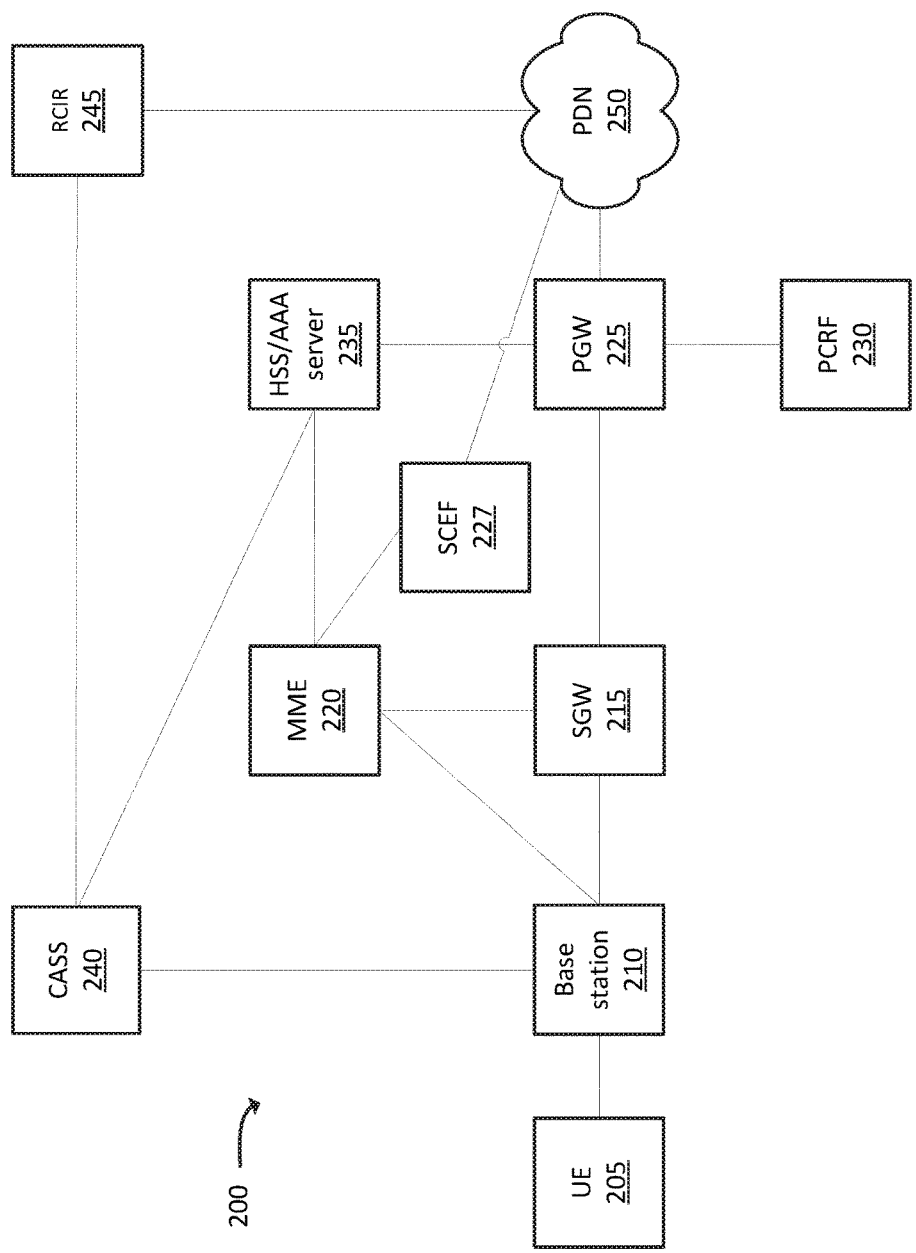
FIGS. 2 and 3 illustrate example environments in which one or more embodiments, described herein, may be implemented.

FIG. 2 illustrates example environment 200, in which systems and/or methods described herein may be implemented. As shown in FIG. 2, environment 200 may include UE 205, base station 210, Serving Gateway ("SGW") 215, Mobility Management Entity ("MME") 220, PDN gateway ("PGW") 225, Service Capability Exposure Function ("SCEF") 227, policy and charging rules function ("PCRF") 230, home subscriber server ("HSS")/authentication, authorization, accounting ("AAA") server 235 (hereinafter referred to as "HSS/AAA server 235"), Carrier Aggregation Selection System ("CASS") 240, Regional Carrier Information Repository ("RCIR") 245, and PDN 250.

While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device. Further, in some implementations, some devices, shown in FIG. 2, may communicate with each other even though connections are not shown between such devices in the figure.

Environment 200 may include an evolved packet system ("EPS") that includes a Third Generation Partnership Project ("3GPP") radio access network ("RAN") and/or an Evolved Packet Core ("EPC") network that is operated based on a 3GPP wireless communication standard. The RAN may be, or may include, a Long-Term Evolution ("LTE") network, a fifth generation ("5G") RAN, etc., that each include one or base stations 210 (which may take the form of evolved NodeBs ("eNBs")), via which UE 205 may communicate with the EPC network. The EPC network may include one or more SGWs 215, PGW/SCEFs 225, and/or MMES 220, and may enable UE 205 to communicate with PDN 250 and/or an Internet protocol ("IP") multimedia subsystem ("IMS") core network (not shown). The IMS core network may include and/or communicate with HSS/AAA server 235, and may manage authentication, session initiation, account information, a user profile, etc., associated with UE 205.

UE 205 may include a computation and communication device, such as a wireless mobile communication device that is capable of communicating with base station 210 and/or PDN 250. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an IoT device (e.g., a sensor, a smart home appliance, or the like); an M2M device; or another type of mobile computation and communication device. UE 205 may send traffic to and/or receive traffic from PDN 250 via base station 210, SGW 215, PGW 225, and/or SCEF 227.

Base station 210 may each include one or more network devices that receive, process, and/or transmit traffic, such as calls, audio, video, text, and/or other data, destined for and/or received from UE 205. In one example, base station 210 may be part of an LTE network, a 5G network, another advanced network, etc. Base station 210 may receive traffic, destined for UE 205, from SGW 215, PGW 225, SCEF 227, and/or PDN 250, and may output the traffic to UE 205. Base station 210 may also receive traffic from UE 205, and may output the traffic to its intended destination via SGW 215, PGW 225, SCEF 227, and/or PDN 250.

In some embodiments, base station 210 may perform carrier aggregation. As discussed above, carrier aggregation may include the utilization of multiple distinct frequency bands (e.g., carriers) for a connection with a given UE 205. In some embodiments, base station 210 may perform carrier aggregation in a manner described herein, in which carrier groups are identified and used in a prioritized manner. Base station 210 may perform the carrier aggregation based on instructions from CASS 240 and/or one or more other devices or systems.

SGW 215 may include one or more network devices that gather, process, search, store, and/or provide information in a manner described herein. SGW 215 may, for example, aggregate traffic received from one or more base stations 210, and may send the aggregated traffic to PDN 250 via PGW 225.

MME 220 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 220 may perform policing operations on traffic destined for and/or received from UE 205. MME 220 may, in some embodiments, receive messages via control plane signaling, which are destined to and/or sent from UE 205. In some embodiments, MME 220 may control plane signaling for UE 205 from SCEF 227, and/or may forward control plane signaling from UE 205 to PDN 250 via SCEF 227.

PGW 225 may include one or more network devices that gather, process, search, store, and/or provide information in a manner described herein. PGW 225 may aggregate traffic received from one or more SGWs 215, etc. and may send the aggregated traffic to PDN 250. PGW 225 may also, or alternatively, receive traffic from PDN 250 and may send the traffic toward UE 205 via base station 210 and/or SGW 215.

SCEF 227 may include one or more network devices that gather, process, search, store, and/or provide information in a manner described herein. SCEF 227 may aggregate traffic received from PDN 250 (and/or one or more other devices and/or systems) and may send the aggregated traffic to UE 205 (e.g., via MME 220). SCEF 227 may also, or alternatively, receive traffic from UE 205 (e.g., via MME 220) and may send the traffic toward PDN 250.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. HSS/AAA server 235 may perform authentication, authorization, and/or accounting operations associated with the subscriber and/or a communication session with UE 205.

CASS 240 may include one or more devices that perform functionality described herein. For example, CASS 240 may generate ordered lists of carrier groups, to be used for carrier aggregation. In some embodiments, the ordered lists may be generated on a per-region basis, such that different regions may have different ranked lists (e.g., due to differences in licenses of available carriers in differing regions).

RCIR 245 may include one or more devices that perform functionality described herein. For example, RCIR 245 may maintain information indicating which carriers are licensed (and/or otherwise available or unavailable) for a wireless telecommunications provider (e.g., a wireless telecommunications provider that owns and/or operates some or all of the network shown in FIG. 2). As discussed herein, CASS 240 may use information received from RCIR 245 in order to generate ordered lists of carrier groups.

PDN 250 may include one or more wired and/or wireless networks. For example, PDN 250 may include an IP-based PDN, a wide area network ("WAN") such as the Internet, a private enterprise network, and/or one or more other networks. UE 205 may connect, through PGW 225 and/or SCEF 227, to data servers, application servers, other UEs 205, and/or to other servers or applications that are coupled to PDN 250. PDN 250 may be connected to one or more other networks, such as a public switched telephone network ("PSTN"), a public land mobile network ("PLMN"), and/or another network. PDN 250 may be connected to one or more devices, such as content providers, applications, web servers, and/or other devices, with which UE 205 may communicate.

Figure 3:
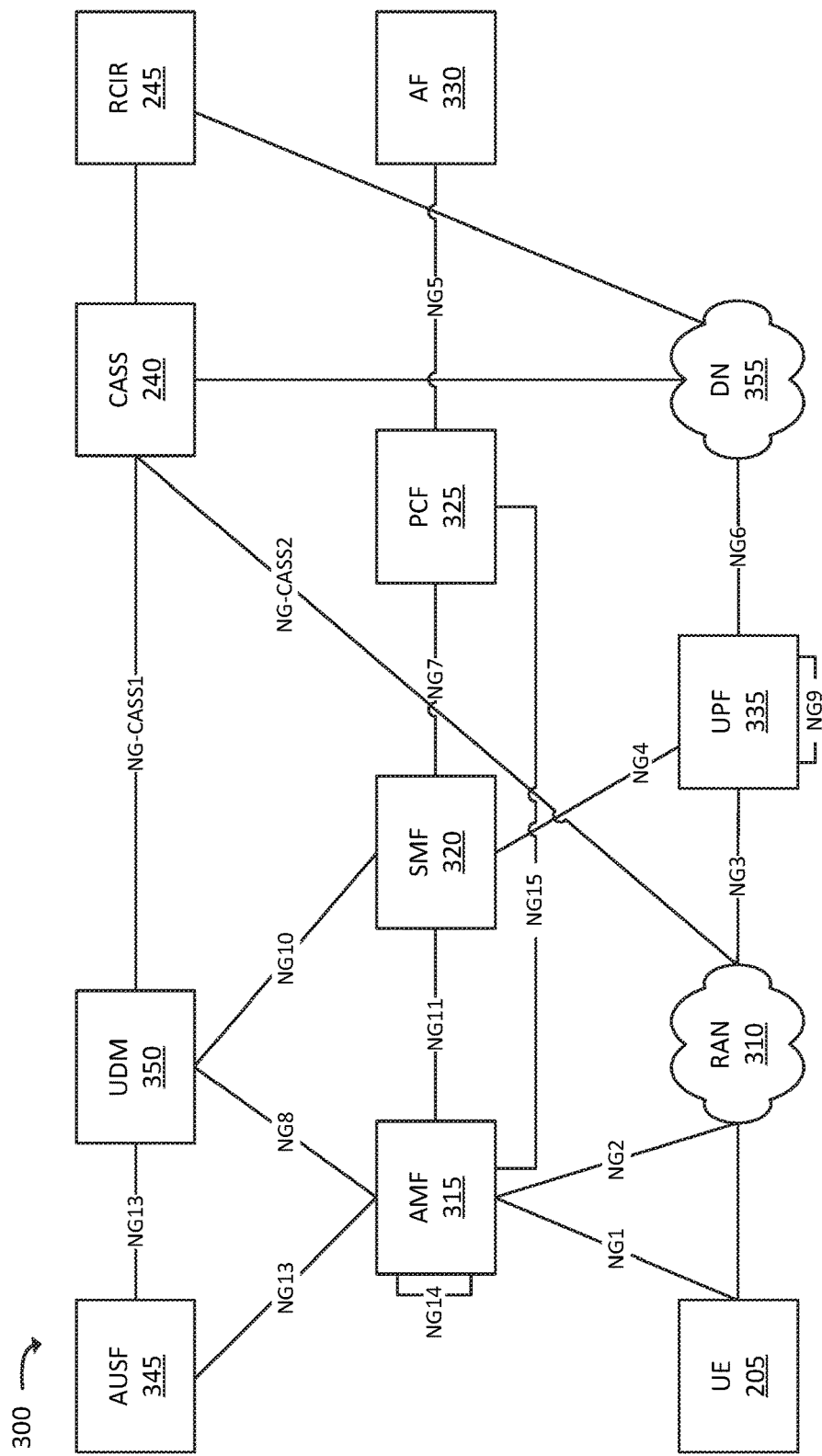

FIG. 3 illustrates another example environment 300, in which one or more embodiments may be implemented. Generally speaking, similar operations may be performed in environment 200 as in environment 300, in order to handle user input in accordance with embodiments described herein. Environment 300 may correspond to a 5G network, and/or may include elements of a 5G network.

As shown in FIG. 3, environment 300 may include UE 205, RAN 310, AMF 315, Session Management Function ("SMF") 320, Policy Control Function ("PCF") 325, Application Function ("AF") 330, User Plane Function ("UPF") 335, Data Network ("DN") 355, Authentication Server Function ("AUSF") 345, Unified Data Management ("UDM") 350, CASS 240, and/or RCIR 245.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

RAN 310 may be, or may include, a 5G RAN that includes one or more base stations, via which UE 205 may communicate with one or more other elements of environment 300. UE 205 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., quality of service parameters, charging parameters, or the like) for certain applications.

UPF 335 may include one or more devices that receive, store, and/or provide data (e.g., user plane data). For example, UPF 335 may receive user plane data (e.g., voice call traffic, data traffic, etc.), destined for UE 205, from DN 355, and may forward the user plane data toward UE 205 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 205 (e.g., via RAN 310, SMF 320, and/or one or more other devices), and may forward the traffic toward DN 355. In some embodiments, UPF 335 may communicate (e.g., via the NG4 interface) with SMF 320, regarding user plane data processed by UPF 335. As mentioned above, this information may aid SMF 320 in monitoring (e.g., tracking, counting, etc.) the traffic for particular subscribers.

DN 355 may include one or more wired and/or wireless networks. For example, DN 355 may include an IP-based PDN, a WAN such as the Internet, a private enterprise network, and/or one or more other networks. UE 205 may communicate, through DN 355, with data servers, application servers 255, other UEs 205, and/or to other servers or applications that are coupled to DN 355. DN 355 may be connected to one or more other networks, such as a public switched telephone network ("PSTN"), a PLMN, and/or another network. DN 355 may be connected to one or more devices, such as content providers, applications, web servers, and/or other devices, with which UE 205 may communicate.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

As similarly described above with respect to environment 200, CASS 240 and/or RCIR 245 may, in some embodiments, be internal components with respect to one or more other devices and/or systems discussed with regard to environment 300. For example, PAIR 240 may have a dedicated interface (shown as "NG-CASS1") between PAIR 240 and UDM 350, so that PAIR 240 can communicate with UDM 350 without traversing the Internet or DN 355.

FIG. 4 illustrates an example data structure 400 that may be used to indicate carriers that are licensed for a particular wireless telecommunications provider (e.g., a wireless telecommunications provider that owns and/or operates the networks shown in FIGS. 2 and/or 3). The carriers are denoted here as "C1," "C2," "C3," and so on. Each one of these carriers may refer to a given set of frequencies (or "band"). For example, C1 may refer to the 38600-38650 MHz band, C2 may refer to the 28650-38700 MHz band, C3 may refer to the 38700-38750 MHz band, and so on.

As also shown in FIG. 4, data structure 400 may include the carrier information for various regions. For example, Region A may refer to a first county, Region B may refer to a second county, and so on. As discussed above, the "regions" may refer to different geographical areas that are associated with different licenses for the wireless telecommunications provider. Regions may be organized in terms of counties, states, provinces, sub-divisions of these types of regions, and/or other officially defined regions. In some embodiments, regions may be defined independently of officially denoted boundaries, such as situations where the licenses for some carriers are defined independently of the officially denoted boundaries.

In some embodiments, RCIR 245 may implement an application programming interface ("API"), via which the information that defines regions and/or carriers that are licensed for the wireless telecommunications provider, on a per-region basis, can be submitted and/or updated. For example, in situations where the licenses for a given region are changed, a user (e.g., an administrator of the wireless telecommunications network, a governmental entity that is associated with a given region and/or has authority to modify the licenses for a given region, etc.) can use one or more commands of the API to modify some or all of the information in data structure 400. In some embodiments, an authentication process may be performed prior to any modification of data structure 400, in order to verify that the user who is requesting a modification is authorized to do so.

As shown in data structure 400, the wireless telecommunication provider may have a license to utilize C2, C3, C4, and C8 in Region A, while the wireless telecommunication provider does not have a license to utilize C1, C5, C6, and C7 in Region A. In Region B, the wireless telecommunication provider may have a license to utilize C2, C4, C5, and C7, while the wireless telecommunication provider does not have a license to utilize C1, C3, C6, and C8 in Region B. As described herein, the information stored in data structure 400 may be used to define and rank carrier groups on a per-region basis, where these carrier groups may be used for carrier aggregation and/or for other purposes.

Figure 5:
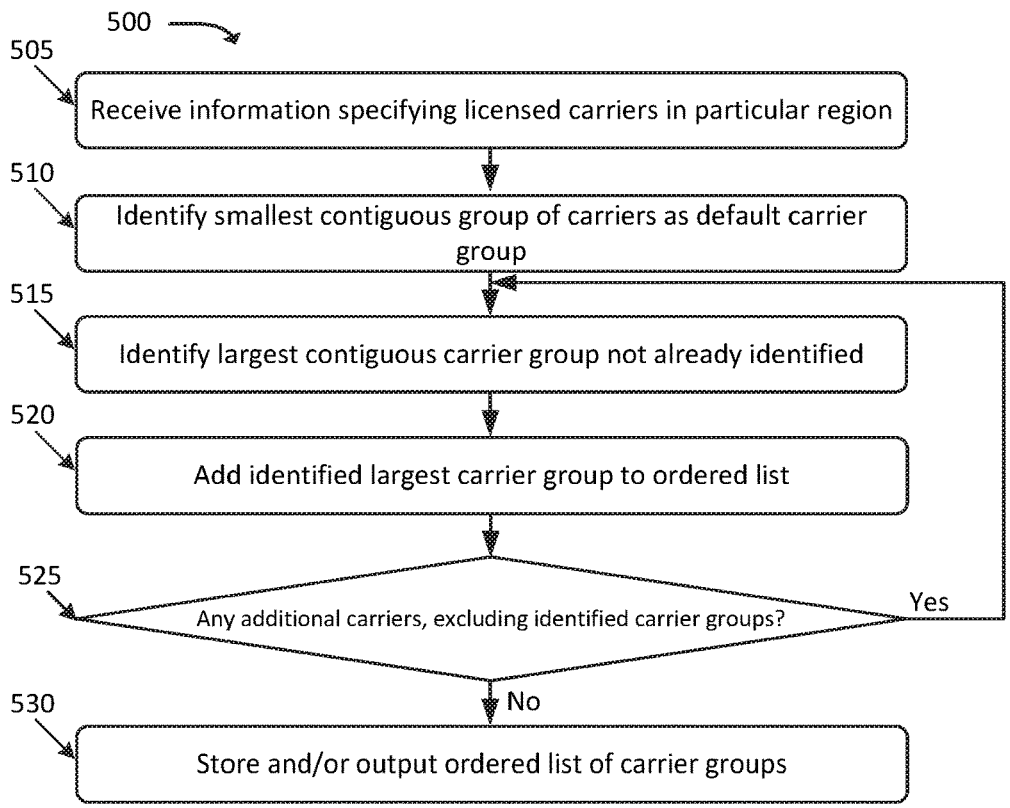
FIG. 5 illustrates an example process for determining and ranking carrier groups for use during carrier aggregation.

FIG. 5 illustrates an example process 500 for determining carrier groups for a given region. For the purposes of explanation here, process 500 will be described in the context of being performed by RCIR 245. In some embodiments, some or all of process 500 may be performed by CASS 240, RCIR 245, and/or one or more other devices or systems. In some embodiments, process 500 may be performed for each region. That is, performing process 500 may yield an ordered/ranked list of carrier groups for one region, and performing process 500 for another region may yield an ordered/ranked list of carrier groups for the other region. Process 500 may thus be performed for each region in a set of regions, in order to generate an ordered list of carrier groups for each region in the set of regions.

As shown, process 500 may include receiving (at 505) information specifying licensed carriers in a particular region. For example, as discussed above, RCIR 245 may receive the information specifying carriers which a particular wireless telecommunications provider is licensed to use (e.g., arranged similarly to, or conveying similar information as, some or all of data structure 400). In some embodiments, RCIR 245 may implement an API, which can allow authorized users to provide the information regarding the licensed carriers for specific regions.

Process 500 may also include identifying (at 510) the smallest contiguous group of carriers as a default carrier group. FIG. 6A conceptually illustrates an example data structure, similar to the one shown in FIG. 4, for an example region ("Region D"). As shown, the wireless telecommunications provider may be licensed to utilize C2-C6, C8, C10, C11, C13-C15, and C17 in Region D. Carriers with abutting frequencies may be considered "contiguous." For example, C2-C6 are a set of contiguous carriers, the set of C10 and C11 is a contiguous set of carriers, and so on. By this token, C8 and C17 would not be considered "contiguous" with any of the other carriers.

In some embodiments, carrier groups may have preset sizes. The preset sizes may be dictated by standards (e.g., standards associated with carrier aggregation), and/or may be determined in some other suitable way. In some embodiments, the preset sizes may include 50 MHz, 100 MHz, 200 MHz, and 400 MHz. In embodiments with these preset sizes, carriers that would otherwise be considered contiguous may be considered non-contiguous. For example, while C2-C6 are technically contiguous, the total quantity of carriers in C2-C6 is five, for a total width of 250 MHz. In some embodiments, when contiguous carriers have a different width than one of the preset widths, these carriers may be logically separated. For example, C2-C5 may be considered as its own contiguous carrier group, while C6 may be considered as its own group. Similarly, C13 and C14 may be considered as one contiguous group (i.e., as having a width of 100 MHz, whereas C13-C15 would have a width of 150

MHz). This separation of otherwise contiguous groups may include identifying the largest group(s) of carriers that match a preset size, and then continuing to split the carriers into groups that match a preset size in descending order. In some embodiments, such groups may be split up in any suitable manner, which may be different than the example presented above.

In accordance with block 510, RCIR 245 may identify (at 510) C8 and C17 as being the "smallest" (e.g., least wide) "contiguous" groups of carriers. That is, C8 and C17 are both individual carriers, and thus the size of these non-contiguous carrier groups is one carrier for each group (i.e., the carrier group of C8 itself includes only one carrier, and is thus one carrier wide). In some embodiments, one carrier group consisting solely of C6 may also be identified (e.g., in situations where C6 is considered separately from C2-C5, by virtue of C2-C5 matching a preset size and C2-C6 not matching a preset size, as discussed above), and another carrier group consisting solely of C15 may be identified.

Since three carrier groups (i.e., C6, C8, and C17, in this example) have been identified as being the smallest, further processing may need to be performed to identify which carrier group should be identified as the default carrier. In some embodiments, the carrier being closest to the center of the available spectrum may be selected as the default. For example, as shown in FIG. 6A, C8 may be selected due to being the closest to the middle of the available spectrum (i.e., C1-C17, in this example), as compared to C6 and C17. As further shown in FIG. 6A, C8 may be denoted as "default," and/or may be denoted with a default value (e.g., 0). This value may be used when the carrier groups are ordered and/or ranked, and will be discussed in greater detail below with respect to FIG. 6B.

In some embodiments, other techniques may be used to select a carrier group in the case where multiple carrier groups are of the same size. In some embodiments, the carrier group closest to the left (e.g., having the lowest frequencies) may be selected, while in some embodiments, the carrier group closest to the right (e.g., having the highest frequencies) may be selected. In some embodiments, carrier groups may be selected arbitrarily once identified as having the same size, and/or may be selected according to some other suitable technique.

Returning to FIG. 5, process 500 may further include identifying (at 515) the largest contiguous carrier group not already identified. Returning to FIG. 6A, the group that includes C2-C5 may be identified as the largest carrier group (e.g., with a width of 200 MHz, assuming that each carrier is 50 MHz wide). As mentioned above, C6 may, in some embodiments, not be considered part of the C2-C5 carrier group, as C2-C6 would not match one of the preset carrier group sizes (i.e., would be 250 MHz). Because C2-C5 have been identified as the next carrier group, RCIR 245 may denote this group with a "1," or other identifier that indicates that this group is the first group that is ranked after the default, or "0," group.

Process 500 may additionally include adding (at 520) the identified largest carrier to an ordered list of carriers. FIG. 6B illustrates an example data structure 600, which may store information regarding ordered/ranked carrier groups on a per-region basis. Continuing with the above example, C8 may be denoted with a "0" in the row for "Region D" in data structure 600, while C2, C3, C4, and C5 may all be denoted with a "1" in the row for "Region D."

Process 500 may also include determining (at 525) whether any additional carriers remain, excluding the carriers that have already been placed into carrier groups. If any carriers remain (525—YES), then process 500 may include repeating blocks 515-525 until all of the carriers have been placed into carrier groups.

For example, continuing with the above example, C2-C5 and C8 may have been placed into carrier groups, while C6, C10, C11, C13-C15, and C17 may still remain. As such, the next group(s) identified (at the next iteration of 515) may be C10-C11 and C13-C14, which each consist of two carriers. As discussed above, the group closest to the center may be selected first (e.g., C10-C11), and/or some other suitable technique may be used to select one of the carrier groups having the same width. As shown in FIG. 6B, data structure 600 may store information reflecting that the group of C10-C11 was selected next (e.g., C10 and C11 are each denoted with a "2" in data structure 600), and that the group of C13-C14 was selected next (e.g., C13 and C14 are each denoted with a "3" in data structure 600). Blocks 515-525 may be repeated until all available carriers in a region are placed in carrier groups, with the carrier groups ranked accordingly.

Once all of the carriers in the region have been placed into carrier groups (at 525—NO), then the process 500 may include storing and/or outputting (at 530) the ordered list of carrier groups. For example, RCIR 245 may store the information, and/or may provide the ordered list (e.g., data structure 600, or similar information) to one or more other systems and/or devices (e.g., to CASS 240). As discussed above, process 500 may be performed multiple times (e.g., for different regions). FIG. 6B further illustrates the results of carrier groups being identified and ranked for another example region ("Region E").

Figure 7:
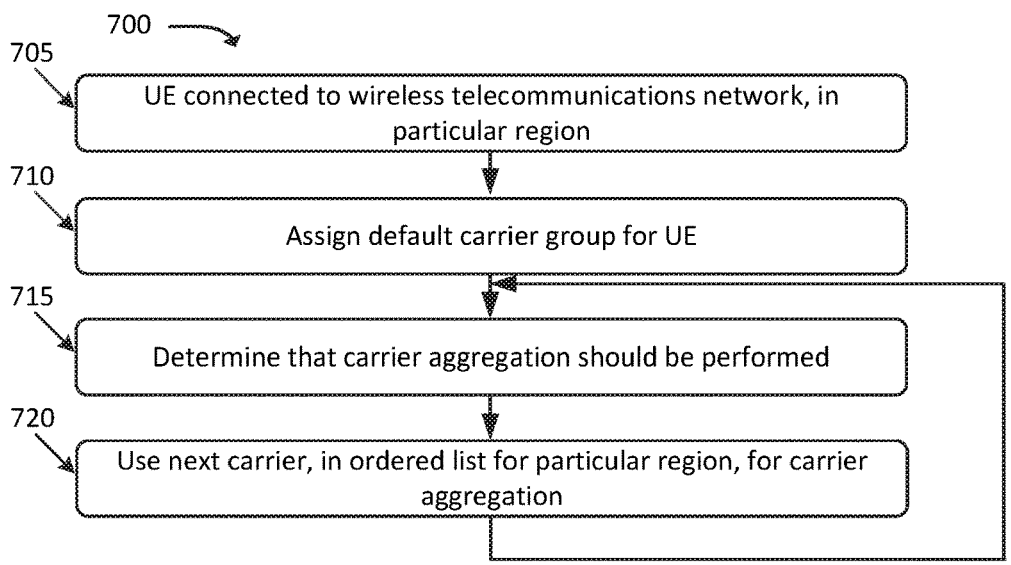
FIG. 7 illustrates an example process for using the ranked carrier groups for carrier aggregation.

FIG. 7 illustrates an example process 700 for performing carrier aggregation in accordance with ranked carrier groups (e.g., as discussed above with respect to process 500), on a per-region basis. In some embodiments, process 700 may be performed by CASS 240. In some embodiments, some or all of process 700 may be performed by one or more other devices or systems (e.g., RCIR 245) in addition to, or in lieu of, CASS 240.

As shown, process 700 may include the connection (at 705) of a UE to a wireless telecommunications network in a particular region. For example, a particular UE 205 may enter communications range of a base station (e.g., base station 210 and/or a base station or other RF communication devices or systems of a RAN, such as RAN 310; for the purposes of explanation, "base station 210" will be referred to in the description of this figure).

Process 700 may further include assigning (at 710) a default carrier group for communications with the UE. For example, CASS 240 may assign a default carrier group, associated with the region in which base station 210 is located. For example, as discussed above, the default carrier group may be determined (e.g., previously determined, prior to the connection of UE 205 to base station 210) by, for example, RCIR 245.

Process 700 may additionally include determining (at 715) that carrier aggregation should be performed. For example, CASS 240, base station 210, and/or some other device or system may determine that carrier aggregation should be performed for the connection with UE 205.

Process 700 may also include using (at 720) the next carrier group, in an ordered list associated with the region, for carrier aggregation. For example, as discussed above, the ordered list may specify which carriers should be used, and in which order, for carrier aggregation. In situations where the default carrier (e.g., carrier group 0, in FIG. 6A) is insufficient for meeting the criteria for which carrier aggregation was performed, the next carrier group (e.g., carrier group 1, in FIG. 6A) would be assigned. Blocks 715 and 720 may be iteratively repeated until enough carriers have been assigned, or the carriers in the region have been exhausted (e.g., no more carriers remain for assignment).

In some embodiments, the need (or desire) for carrier aggregation may be determined (e.g., at 715) based on available network resources (e.g., whether base station 210 has available resources to perform carrier aggregation), performance requirements (e.g., as determined based on a comparison of Quality of Service ("QoS") requirements (e.g., as indicated by a QoS Class Identifier ("QCI")) of communications associated with UE 205 to the actual QoS being provided to UE 205), and/or any other suitable mechanism for initiating carrier aggregation.

In some embodiments, CASS 240, MME 220, AMF 315, and/or some other device or system may track a quantity of carriers utilized by a base station in another region, for communications with UE 205, and use that quantity (or approximately that quantity) of carriers when UE 205 initially connects to base station 210 (e.g., at 705), and/or when the need for carrier aggregation is determined (e.g., at 715).

In some embodiments, CASS 240 may track historical data associated with UE 205, such as how many carriers UE 205 historically uses. For example, if UE 205 uses an average of 200 MHz (e.g., due to carrier aggregation) over a given time window (e.g., within a past week, a past month, etc.), then CASS 240 may determine that UE 205 should be assigned 200 MHz (or approximately 200 MHz) worth of carrier groups when connecting to base station 210, and/or when the need for carrier aggregation is determined.

To elaborate, an example is provided with regard to the example carrier groups illustrated in FIG. 6B. Assume, for example, that a particular UE 205, which has used an average of 150 MHz of spectrum, by way of carrier aggregation, when connected to the wireless telecommunications network over the past seven days. As such, CASS 240 (and/or some other device or system) may maintain information indicating the average usage of 150 MHz of spectrum over the past seven days. As such, when initially connecting to base station 210, CASS 240 may determine that carrier groups 0 and 2 should be used. That is, the default carrier group 0 (consisting only of C8) and additional carrier group 2 (consisting of C10 and C11, and also being the highest ranked carrier group with 100 MHz of width) may be assigned when UE 205 connects to base station 210 (e.g., at 705) and/or when the need for carrier aggregation is determined (e.g., at 715). As another example, in lieu of assigning carrier groups 0 and 2 to UE 205, CASS 240 may determine that carrier group 1 (consisting of C2-C5) should be assigned to UE 205 (and that carrier group 0 should not be assigned), as carrier group 1 is the highest ranked carrier group that is wide enough (200 MHz, assuming each carrier is 50 MHz wide) to accommodate the average carrier usage (150 MHz) associated with UE 205.

In some embodiments, the usage of particular UEs 205 may be tracked over time, and the average usage of carriers can change over time. When the average usage changes, the assignment of carriers may change in a manner similar to that discussed above. In some embodiments, usage may be tracked on a more granular or dynamic basis. For example, if UE 205 typically utilizes 150 MHz worth of spectrum, via carrier aggregation, between the hours of 9 AM-11 AM and 50 MHz or less during other times, then additional carrier groups may be assigned during the hours of 9 AM-11 AM (e.g., in a manner similar to that described above), while a default carrier group may be assigned (e.g., in accordance with block 710) for UE 205 during the other times. In some embodiments, CASS 240 may communicate with one or more other devices of the wireless telecommunications network (e.g., HSS/AAA server 235 and/or UDM 350) to determine historical information associated with users, and may perform carrier aggregation (e.g., may select carrier groups, as discussed above) in a manner based on the historical information received from HSS/AAA server 235 and/or UDM 350.

Figure 8:
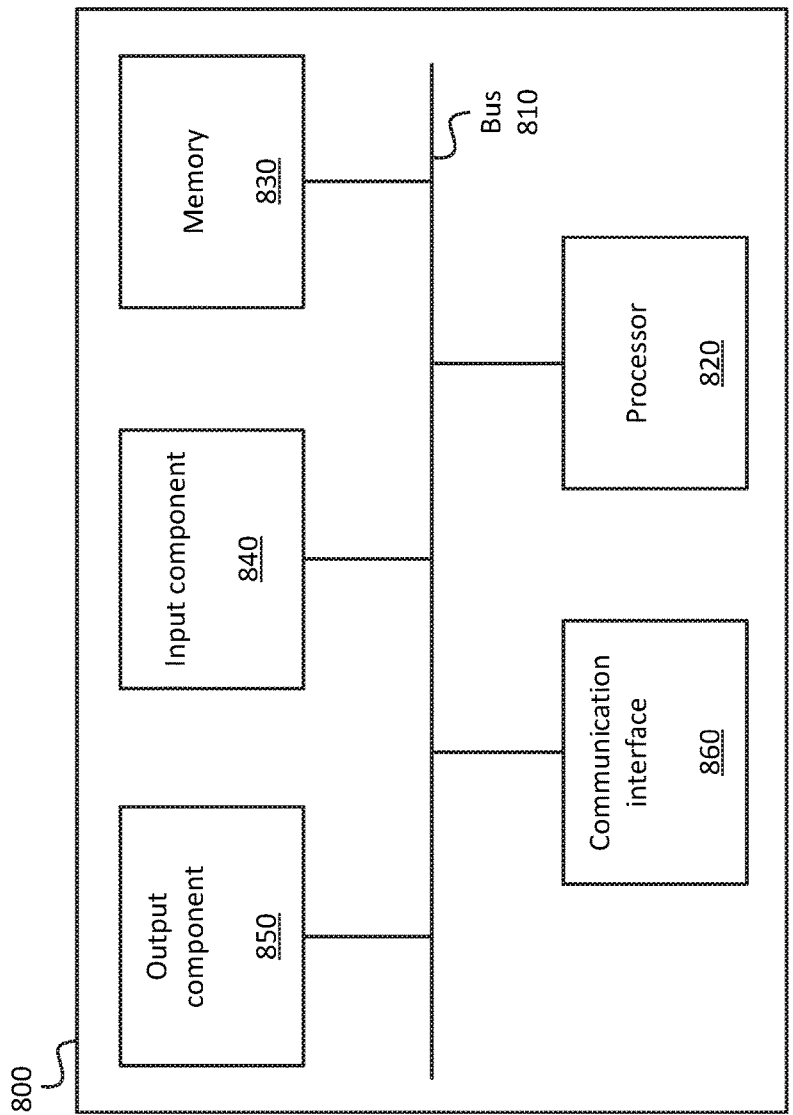
FIG. 8 illustrates example components of one or more devices, according to one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 5 and 7, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that, the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the processor-executable instructions causes the one or more processors to:
   receive information specifying a plurality of carriers that are licensed for use by a particular wireless telecommunications provider,
      wherein each carrier, of the plurality of carriers, includes a contiguous range of frequencies of the radio frequency ("RF") spectrum;
   identify, from the plurality of carriers that are licensed for use by the particular wireless telecommunications provider, a plurality of groups of carriers,
      wherein each group of carriers includes one or more carriers that correspond to a contiguous range of frequencies;
   identify a first group of carriers, from the plurality of groups of carriers, that contains a smallest contiguous range of frequencies of the plurality of groups of carriers;
   rank the remaining groups of carriers, from the plurality of groups of carriers, in descending order with respect to sizes of frequency ranges respectively included in each of the remaining groups of carriers;
   detect a connection of a user equipment ("UE") with a base station of the wireless telecommunications network;
   assign, for the connection of the UE with the base station, the default group of carriers based on detecting the connection of the UE with the base station;
   determine, after assigning the default group of carriers, that carrier aggregation should be performed for the connection between the UE and the base station;
   perform, based on the determination, carrier aggregation for the connection between the UE and the base station, wherein performing the carrier aggregation includes adding groups of carriers to the connection between the UE and the base station in an order that is based on the ranking of the groups of carriers;
   store information indicating that carrier aggregation was performed, the information indicating at least one of: (a) a quantity of carriers used for the carrier aggregation, or (b) a width of the range of frequencies included in the groups of carriers used for the carrier aggregation;

detect that the UE has connected to another base station; and assign, to the connection between the UE and the other base station, a quantity of carriers, associated with the other base station, that (a) meets or exceeds the quantity of carriers used for the carrier aggregation, or (b) has a width of frequency ranges that meets or exceeds the width of frequency ranges included in the groups of carriers used for the carrier aggregation.

2. The device of claim 1, wherein the ranking of the groups includes at least:

a second group of carriers as the highest ranked group of carriers, in the ranked plurality of groups of carriers, that includes the largest frequency range of the ranked plurality of groups of carriers, and a third group of carriers that includes a smaller frequency range than the second group of carriers, the third group of carriers being ranked lower than the second group of carriers.

3. The device of claim 2, wherein executing the processor-executable instructions, to perform the carrier aggregation, further causes the one or more processors to add the second group of carriers to the connection between the UE and the base station, before the third group of carriers is added to the connection between the UE and the base station.

4. The device, wherein the quantity of assigned carriers is assigned based on the detection of the connection of the UE to the other base station.

5. A device, comprising:

a non-transitory computer-readable medium storing a set of processor-executable instructions; and one or more processors configured to execute the set of processor-executable instructions, wherein executing the set of processor-executable instructions causes the one or more processors to:

receive information specifying a first plurality of carriers that are licensed for use by a particular wireless telecommunications provider, wherein each carrier, of the first plurality of carriers, includes a contiguous range of frequencies of the radio frequency ("RF") spectrum;

identify, from the first plurality of carriers that are licensed for use by the particular wireless telecommunications provider, a first plurality of groups of carriers, wherein each group of carriers includes one or more carriers that correspond to a contiguous range of frequencies;

identify a first group of carriers, from the first plurality of groups of carriers, that contains a smallest contiguous range of frequencies of the first plurality of groups of carriers;

rank the remaining groups of carriers, from the first plurality of groups of carriers, in descending order with respect to sizes of frequency ranges respectively included in each of the remaining groups of carriers;

detect a connection of a user equipment ("UE") with a base station of the wireless telecommunications network, wherein the base station is associated with a first set of licenses, for the wireless telecommunications provider, to use the first plurality of carriers, wherein another base station is associated with a second set of licenses, for the wireless telecommunications provider, to use a second plurality of carriers;

assign, for the connection of the UE with the base station, the default group of carriers based on detecting the connection of the UE with the base station;

determine, after assigning the default group of carriers, that carrier aggregation should be performed for the connection between the UE and the base station;

perform, based on the determination, carrier aggregation for the connection between the UE and the base station, wherein performing the carrier aggregation includes adding groups of carriers to the connection between the UE and the base station in an order that is based on the ranking of the groups of carriers;

receive information specifying the second plurality of carriers;

identify, from the second plurality of carriers, a second plurality of groups of carriers;

identify a third group of carriers, from the second plurality of groups of carriers, that contains a smallest contiguous range of frequencies of the second plurality of groups of carriers; and rank the remaining groups of carriers, from the second plurality of groups of carriers, with respect to sizes of frequency ranges respectively included in each of the remaining groups of carriers of the second plurality of carriers.

6. The device of claim 5, wherein the first group of carriers and a second group of carriers, of the first plurality of carriers, include a same range of frequencies, wherein the first group is closer, than the second group, to a center of a frequency band that includes the frequencies associated with each carrier, of the first plurality of carriers, and wherein the first group is selected as the default group, in lieu of the second group, based on the first group being closer to the center of the frequency band.

7. The device of claim 5, wherein the ranking of the groups includes at least:

a second group of carriers as the highest ranked group of carriers, in the ranked plurality of groups of carriers, that includes the largest frequency range of the ranked plurality of groups of carriers, and a third group of carriers that includes a smaller frequency range than the second group of carriers, the third group of carriers being ranked lower than the second group of carriers, wherein performing the carrier aggregation further includes adding the second group of carriers to the connection between the UE and the base station, before the third group of carriers is added to the connection between the UE and the base station.

8. A non-transitory computer-readable medium, storing a set of processor-executable instructions, which, when executed by one or more processors, cause the one or more processors to:

receive information specifying a plurality of carriers that are licensed for use by a particular wireless telecommunications provider, wherein each carrier, of the plurality of carriers, includes a contiguous range of frequencies of the radio frequency ("RF") spectrum;

identify, from the plurality of carriers that are licensed for use by the particular wireless telecommunications provider, a plurality of groups of carriers, wherein each group of carriers includes one or more carriers that correspond to a contiguous range of frequencies;

identify a first group of carriers, from the plurality of groups of carriers, that contains a smallest contiguous range of frequencies of the plurality of groups of carriers;

rank the remaining groups of carriers, from the plurality of groups of carriers, in descending order with respect to sizes of frequency ranges respectively included in each of the remaining groups of carriers;

detect a connection of a user equipment ("UE") with a base station of the wireless telecommunications network;

assign, for the connection of the UE with the base station, the default group of carriers based on detecting the connection of the UE with the base station;

determine, after assigning the default group of carriers, that carrier aggregation should be performed for the connection between the UE and the base station;

perform, based on the determination, carrier aggregation for the connection between the UE and the base station, wherein performing the carrier aggregation includes adding groups of carriers to the connection between the UE and the base station in an order that is based on the ranking of the groups of carriers;

store information indicating that carrier aggregation was performed, the information indicating at least one of: (a) a quantity of carriers used for the carrier aggregation, or (b) a width of the range of frequencies included in the groups of carriers used for the carrier aggregation;

detect that the UE has connected to another base station; and assign, to the connection between the UE and the other base station, a quantity of carriers, associated with the other base station, that (a) meets or exceeds the quantity of carriers used for the carrier aggregation, or (b) has a width of frequency ranges that meets or exceeds the width of frequency ranges included in the groups of carriers used for the carrier aggregation.

9. The non-transitory computer-readable medium of claim 8, wherein the ranking of the groups includes at least:

a second group of carriers as the highest ranked group of carriers, in the ranked plurality of groups of carriers, that includes the largest frequency range of the ranked plurality of groups of carriers, and a third group of carriers that includes a smaller frequency range than the second group of carriers, the third group of carriers being ranked lower than the second group of carriers.

10. The non-transitory computer-readable medium of claim 9, wherein the processor-executable instructions, to perform the carrier aggregation, further include processor-executable instructions to add the second group of carriers to the connection between the UE and the base station, before the third group of carriers is added to the connection between the UE and the base station.

11. The non-transitory computer-readable medium of claim 8, wherein the quantity of assigned carriers is assigned based on the detection of the connection of the UE to the other base station.

12. A non-transitory computer-readable medium, storing a set of processor-executable instructions, which, when executed by one or more processors, cause the one or more processors to:

receive information specifying a first plurality of carriers that are licensed for use by a particular wireless telecommunications provider, wherein each carrier, of the first plurality of carriers, includes a contiguous range of frequencies of the radio frequency ("RF") spectrum;

identify, from the first plurality of carriers that are licensed for use by the particular wireless telecommunications provider, a first plurality of groups of carriers, wherein each group of carriers includes one or more carriers that correspond to a contiguous range of frequencies;

identify a first group of carriers, from the first plurality of groups of carriers, that contains a smallest contiguous range of frequencies of the first plurality of groups of carriers;

rank the remaining groups of carriers, from the first plurality of groups of carriers, in descending order with respect to sizes of frequency ranges respectively included in each of the remaining groups of carriers;

detect a connection of a user equipment ("UE") with a base station of the wireless telecommunications network, wherein the base station is associated with a first set of licenses, for the wireless telecommunications provider, to use the first plurality of carriers, wherein another base station is associated with a second set of licenses, for the wireless telecommunications provider, to use a second plurality of carriers;

assign, for the connection of the UE with the base station, the default group of carriers based on detecting the connection of the UE with the base station;

determine, after assigning the default group of carriers, that carrier aggregation should be performed for the connection between the UE and the base station;

perform, based on the determination, carrier aggregation for the connection between the UE and the base station, wherein performing the carrier aggregation includes adding groups of carriers to the connection between the UE and the base station in an order that is based on the ranking of the groups of carriers;

receive information specifying the second plurality of carriers;

identify, from the second plurality of carriers, a second plurality of groups of carriers;

identify a third group of carriers, from the second plurality of groups of carriers, that contains a smallest contiguous range of frequencies of the second plurality of groups of carriers; and rank the remaining groups of carriers, from the second plurality of groups of carriers, with respect to sizes of frequency ranges respectively included in each of the remaining groups of carriers of the second plurality of carriers.

13. The non-transitory computer-readable medium of claim 12, wherein the first group of carriers and a second group of carriers, of the first plurality of carriers, include a same range of frequencies, wherein the first group is closer, than the second group, to a center of a frequency band that includes the frequencies associated with each carrier, of the first plurality of carriers, and wherein the first group is selected as the default group, in lieu of the second group, based on the first group being closer to the center of the frequency band.

14. The non-transitory computer-readable medium of claim 12, wherein the groups includes at least:

a second group of carriers as the highest ranked group of carriers, in the ranked plurality of groups of carriers, that includes the largest frequency range of the ranked plurality of groups of carriers, and a third group of carriers that includes a smaller frequency range than the second group of carriers, the third group of carriers being ranked lower than the second group of carriers, wherein performing the carrier aggregation further includes adding the second group of carriers to the connection between the UE and the base station, before the third group of carriers is added to the connection between the UE and the base station.

15. A method, comprising:

receiving information specifying a plurality of carriers that are licensed for use by a particular wireless telecommunications provider,
wherein each carrier, of the plurality of carriers, includes a contiguous range of frequencies of the radio frequency ("RF") spectrum;

identifying, from the plurality of carriers that are licensed for use by the particular wireless telecommunications provider, a plurality of groups of carriers,
wherein each group of carriers includes one or more carriers that correspond to a contiguous range of frequencies;

identifying a first group of carriers, from the plurality of groups of carriers, that contains a smallest contiguous range of frequencies of the plurality of groups of carriers;

ranking the remaining groups of carriers, from the plurality of groups of carriers, in descending order with respect to sizes of frequency ranges respectively included in each of the remaining groups of carriers;

detecting a connection of a user equipment ("UE") with a base station of the wireless telecommunications network;

assigning, for the connection of the UE with the base station, the default group of carriers based on detecting the connection of the UE with the base station;

determining, after assigning the default group of carriers, that carrier aggregation should be performed for the connection between the UE and the base station;

performing, based on the determination, carrier aggregation for the connection between the UE and the base station, wherein performing the carrier aggregation includes adding groups of carriers to the connection between the UE and the base station in an order that is based on the ranking of the groups of carriers;

storing information indicating that carrier aggregation was performed, the information indicating at least one of: (a) a quantity of carriers used for the carrier aggregation, or (b) a width of the range of frequencies included in the groups of carriers used for the carrier aggregation;

detecting that the UE has connected to another base station; and assigning, to the connection between the UE and the other base station, a quantity of carriers, associated with the other base station, that (a) meets or exceeds the quantity of carriers used for the carrier aggregation, or (b) has a width of frequency ranges that meets or exceeds the width of frequency ranges included in the groups of carriers used for the carrier aggregation.

16. The method of claim 15, wherein the ranking of the groups includes at least:

a second group of carriers as the highest ranked group of carriers, in the ranked plurality of groups of carriers, that includes the largest frequency range of the ranked plurality of groups of carriers, and a third group of carriers that includes a smaller frequency range than the second group of carriers, the third group of carriers being ranked lower than the second group of carriers, wherein performing the aggregation further includes adding the second group of carriers to the connection between the UE and the base station, before the third group of carriers is added to the connection between the UE and the base station.

17. The method of claim 15, wherein the quantity of assigned carriers is assigned based on the detection of the connection of the UE to the other base station.

18. A method, comprising:

receiving information specifying a first plurality of carriers that are licensed for use by a particular wireless telecommunications provider,
wherein each carrier, of the first plurality of carriers, includes a contiguous range of frequencies of the radio frequency ("RF") spectrum;

identifying, from the first plurality of carriers that are licensed for use by the particular wireless telecommunications provider, a first plurality of groups of carriers,
wherein each group of carriers includes one or more carriers that correspond to a contiguous range of frequencies;

identifying a first group of carriers, from the first plurality of groups of carriers, that contains a smallest contiguous range of frequencies of the first plurality of groups of carriers;

ranking the remaining groups of carriers, from the first plurality of groups of carriers, in descending order with respect to sizes of frequency ranges respectively included in each of the remaining groups of carriers;

detecting a connection of a user equipment ("UE") with a base station of the wireless telecommunications network,
wherein the base station is associated with a first set of licenses, for the wireless telecommunications provider, to use the first plurality of carriers,
wherein another base station is associated with a second set of licenses, for the wireless telecommunications provider, to use a second plurality of carriers assigning, for the connection of the UE with the base station, the default group of carriers based on detecting the connection of the UE with the base station;

determining, after assigning the default group of carriers, that carrier aggregation should be performed for the connection between the UE and the base station;

performing, based on the determination, carrier aggregation for the connection between the UE and the base station, wherein performing the carrier aggregation includes adding groups of carriers to the connection between the UE and the base station in an order that is based on the ranking of the groups of carriers;

receiving information specifying the second plurality of carriers;

identifying, from the second plurality of carriers, a second plurality of groups of carriers;

identifying a third group of carriers, from the second plurality of groups of carriers, that contains a smallest contiguous range of frequencies of the second plurality of groups of carriers; and ranking the remaining groups of carriers, from the second plurality of groups of carriers, with respect to sizes of frequency ranges respectively included in each of the remaining groups of carriers of the second plurality of carriers.

19. The method of claim 18, wherein the first group of carriers and a second group of carriers, of the first plurality of carriers, include a same range of frequencies,
   wherein the first group is closer, than the second group, to a center of a frequency band that includes the frequencies associated with each carrier, of the first plurality of carriers, and
   wherein the first group is selected as the default group, in lieu of the second group, based on the first group being closer to the center of the frequency band.

20. The method of claim 18, wherein the ranking of the groups includes at least:
   a second group of carriers as the highest ranked group of carriers, in the ranked plurality of groups of carriers, that includes the largest frequency range of the ranked plurality of groups of carriers, and
   a third group of carriers that includes a smaller frequency range than the second group of carriers, the third group of carriers being ranked lower than the second group of carriers,
   wherein performing the carrier aggregation further includes adding the second group of carriers to the connection between the UE and the base station, before the third group of carriers is added to the connection between the UE and the base station.

* * * * *